United States Patent
Zhang et al.

(10) Patent No.: US 10,016,917 B2
(45) Date of Patent: Jul. 10, 2018

(54) METHOD OF INJECTING SEALING GEL INTO RECESS

(71) Applicant: Tyco Electronics (Shanghai) Co Ltd., Shanghai (CN)

(72) Inventors: Dandan Zhang, Shanghai (CN); Lvhai Hu, Shanghai (CN); Fengchun Xie, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 558 days.

(21) Appl. No.: 14/337,716

(22) Filed: Jul. 22, 2014

(65) Prior Publication Data
US 2015/0021819 A1 Jan. 22, 2015

(30) Foreign Application Priority Data

Jul. 22, 2013 (CN) .................. 2013 1 03085223

(51) Int. Cl.
| | |
|---|---|
| *B29C 45/14* | (2006.01) |
| *B29C 45/64* | (2006.01) |
| *B29C 45/72* | (2006.01) |
| *B29D 99/00* | (2010.01) |
| *B29K 101/12* | (2006.01) |
| *B29K 105/00* | (2006.01) |
| *B29L 31/26* | (2006.01) |

(52) U.S. Cl.
CPC .............. *B29C 45/14* (2013.01); *B29C 45/64* (2013.01); *B29C 45/7207* (2013.01); *B29D 99/0053* (2013.01); *B29K 2101/12* (2013.01); *B29K 2105/0061* (2013.01); *B29L 2031/265* (2013.01)

(58) Field of Classification Search
None
See application file for complete search history.

(56) References Cited

U.S. PATENT DOCUMENTS

| | | | | |
|---|---|---|---|---|
| 3,885,300 | A * | 5/1975 | Hoffman ................ | B21D 53/00 264/267 |
| 3,962,399 | A * | 6/1976 | Shepherd, Jr. ........... | B25G 3/34 264/261 |
| 3,966,869 | A * | 6/1976 | Kohl .................... | A61J 11/0085 215/11.1 |
| 4,261,947 | A * | 4/1981 | Ogi .................. | B29C 45/14467 264/248 |
| 5,670,109 | A * | 9/1997 | DeRees .................. | B29C 66/54 156/304.5 |
| 5,683,641 | A * | 11/1997 | Jaskowiak ........ | B29C 45/14344 264/267 |
| 6,238,610 | B1 * | 5/2001 | Yamazaki ........... | B29C 45/0025 264/267 |

* cited by examiner

*Primary Examiner* — Edmund Lee
(74) *Attorney, Agent, or Firm* — Barley Snyder

(57) ABSTRACT

A method of injecting a sealing gel into a predetermined structure for a work piece is provided. The method includes the following steps: providing a molding tool with an insertion structure shaped with respect to compliment the predetermined structure, enclosing a local region of a recess of the work piece with the molding tool, injecting a fluid sealing gel into the molding tool, and dismantling the molding tool after the sealing gel has cooled to a solid state.

24 Claims, 3 Drawing Sheets

METHOD OF INJECTING SEALING GEL INTO RECESS

CROSS-REFERENCE TO RELATED APPLICATIONS

This application claims the benefit of the filing date under 35 U.S.C. § 119(a)-(d) of Chinese Patent Application No. 201310308522.3 filed on Jul. 22, 2013 in the State Intellectual Property Office of China.

FIELD OF THE INVENTION

The invention relates to a method of injecting sealing gel into a work piece and, more particularly, to a method of injecting a sealing gel into a recess of a work piece to form a predetermined structure proximate to the recess.

BACKGROUND

A method for injecting a sealing gel into a recess for a work piece is well known. Generally, this known method includes a step of directly injecting a fluid sealing gel into the recess that is not enclosed and directly exposed the outside, in an open injection manner, especially if the recess is continuously uniform. However, if the recess is not continuously uniform or has a special shape or structure, it is difficult or even impossible to form inject the sealing gel proximate the recess, for example, to form a predetermined structure with a special shaped slot. During an open injection, the fluid sealing gel, injected into the recess, can freely flow into the recess and cannot be constrained to a special shape proximately positioned with the recess. Thereby, it is impossible to form a special shaped slot in such open injection manner. In the prior art, after the sealing gel is directly injected into the recess during open injection, solidified sealing gel needs to be cut and ground a special shaped slot, in order to remove overflowed or excrescent sealing gel. Accordingly, the method in the prior takes much time and effort, and wastes a lot of sealing gel, increasing the cost.

SUMMARY

The invention has been made to overcome or alleviate at least one aspect of the above mentioned disadvantages.

Accordingly, it is an object of the invention to provide a method of injecting a sealing gel into a predetermined structure for a work piece. The method includes the following steps: providing a molding tool with an insertion structure shaped with respect to compliment the predetermined structure, enclosing a local region of a recess of the work piece with the molding tool, injecting a fluid sealing gel into the molding tool, and dismantling the molding tool after the sealing gel has cooled to a solid state.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF THE EMBODIMENT(S)

Figure 1:
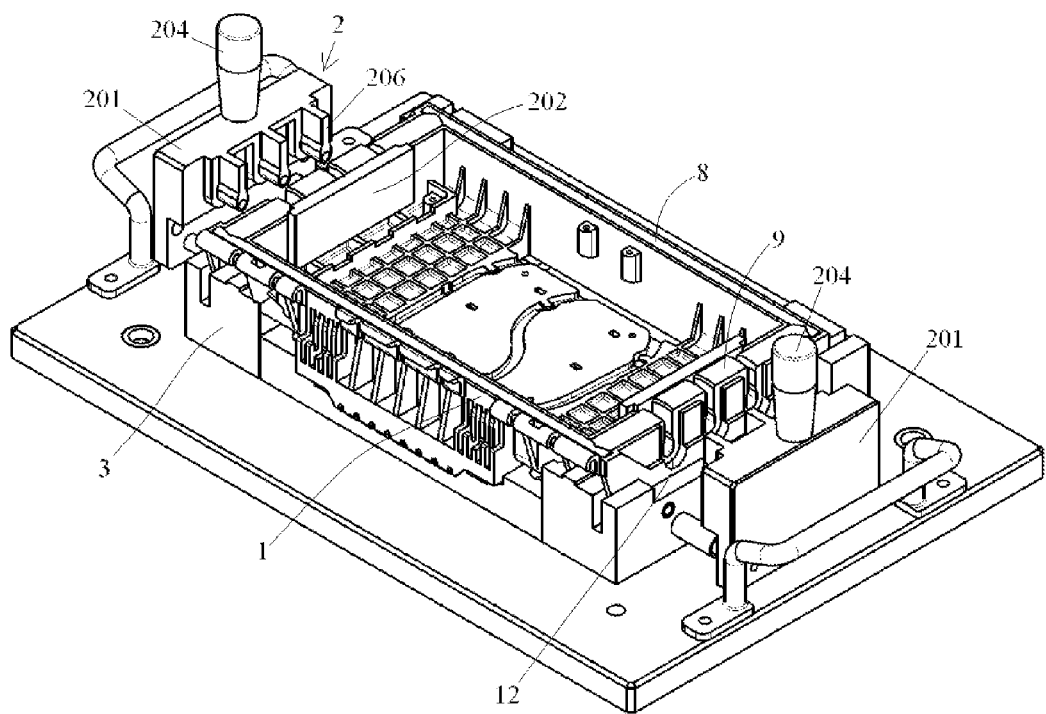
FIG. 1 is a perspective view of a work piece having a predetermined structure of a sealing gel formed by a molding tool 2 according to the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to FIG. 1, a method of injecting a sealing gel into a recess 8 of a work piece 1 according to the invention will be described, such that a predetermined structure 12 is formed proximate to the recess 8. In general, the method includes the following general steps:

S100: providing a molding tool 2 having an insertion structure complementary to the predetermined structure 12;

S200: enclosing a local region 9 of the recess 8 with the molding tool 2, and injecting a fluid sealing gel into the molding tool 2; and S300: after the sealing gel has been cooled and solidified, dismantling the molding tool 2 so that the predetermined structure 12 defined by sealing gel is formed at the local region 9 of the recess 8.

As shown in FIG. 1, the work piece 1 is secured to a positioning platform 3 according to the invention, in which parts of the molding tool 2 for forming the predetermined structure 12 from the sealing gel. The predetermined structure 12 is positioned proximate at a local region 9 of a recess 8 of the work piece 1.

As shown in FIG. 1, the recess 8 for receiving the sealing gel therein is formed along a top surface of a side wall of the work piece 1 The are two local regions 9 proximate to the recess 8 where the predetermined structure 12 is to be formed. For example, the local region 9 may be a passage for introducing a cable into the work piece 1 from outside.

In the shown embodiment, the two local regions 9 are symmetrically located at both ends of the work piece 1. The predetermined structure 12 includes at least one vertical slot extending in a height direction of the side wall of the work piece 1. However, one skilled in the art should appreciate that the invention is not limited to the shown embodiments. Rather, the local regions 9 of the recess 8 may be located at any position of the work piece 1, and the predetermined structure 12 may include any other special structure, such as round hole, curved groove, etc.

Figure 2:
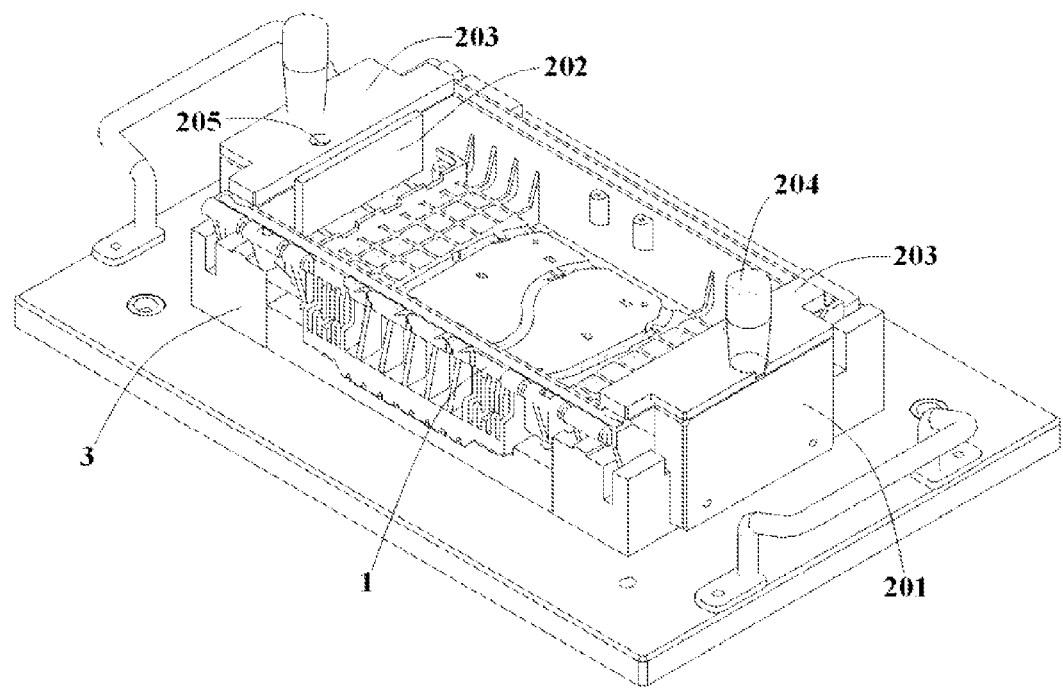
FIG. 2 is a perspective view of the work piece shown in FIG. 1 with the with the molding tool according to the invention.

With reference to FIG. 2, the molding tool 2 is shown and encloses the local region 9 of the recess 8 of the work piece 1.

As shown in FIG. 1 and FIG. 2, the molding tool 2 includes an outside plate 201, an inside plate 202, a top cover plate 203 (only shown in FIG. 2) and an injection port 204. The outside plate 201 is configured to fit on an outside surface of the side wall at the local region 9 of the recess 8. The inside plate 202 is configured to fit on an inside surface of the side wall at the local region 9 of the recess 8. The top cover plate 203 is configured to cover top surfaces of the outside plate 201 and the inside plate 202.

After the outside plate 201, the inside plate 202 and the top cover plate 203 are fitted on the side wall at the local region 9 of the recess 8, the local region 9 of the recess 8 is enclosed by the outside plate 201, the inside plate 202 and the top cover plate 203, achieving a local enclosed gel injection chamber (or referred as "inside chamber" herein) defined by the molding tool 2.

Referring to FIGS. 1-2 again, the outside plate 201 is formed with an insertion structure 206 complementary to the predetermined structure 12. In the shown embodiment, the insertion structure 206 includes at least one vertical rib vertically extending from a main body of the outside plate 201 and corresponding to the at least one vertical slot, respectively. When the outside plate 201 is fitted on the outside surface of the side wall of the work piece 1, the insertion structure 206 is inserted into the local region 9 of the recess 8 to form the predetermined structure 12 complementary to the insertion structure 206. However, the invention is not limited to the shown embodiments, and one skilled in the art should appreciate that the insertion structure 206 may be formed on the inside plate 202 or the top cover plate 203.

As shown in FIGS. 1-2, the injection port 204 passes through the top cover plate 203 and communicates with the inside chamber of the molding tool 2, such that the fluid sealing gel can be injected into the inside chamber of the molding tool 2 through the injection port 204.

As shown in FIGS. 1-2, a vent hole 205 is formed in the top cover plate 203. During injecting the fluid sealing gel into the inside chamber of the molding tool 2, air can be discharged outside the molding tool 2 through the vent hole 205 to prevent air bubbles from being generated in the sealing gel.

Now with reference to FIGS. 1 and 2, a process of injecting the sealing gel into the local region of the recess will be described.

Firstly, as shown in FIG. 1, a molding tool 2 is proved and includes the insertion structure 206 complementary to the predetermined structure 12. Next, as shown in FIG. 2, the molding tool encloses the local region 9 of the recess 8, and a fluid sealing gel is injected into the molding tool 2. Next, after the injected sealing gel has cooled and solidified, the molding tool 2 is dismantled to form the work piece 1. Accordingly, the predetermined structure 12 defined by sealing gel is accurately formed at the local region 9 of the recess 8.

In an exemplary embodiment of the invention, before or after the sealing gel is injected into the local region 9 of the recess 8 using the molding tool 2, other regions of the recess 8 except for the local region 9 may be injected with a sealing gel in an open injection manner.

According to the invention, the sealing gel has a solid state and a fluid state, and the sealing gel is capable of being converted from the solid state to the fluid state by heating and capable of being converted from the fluid state to the solid state by cooling.

Figure 3:
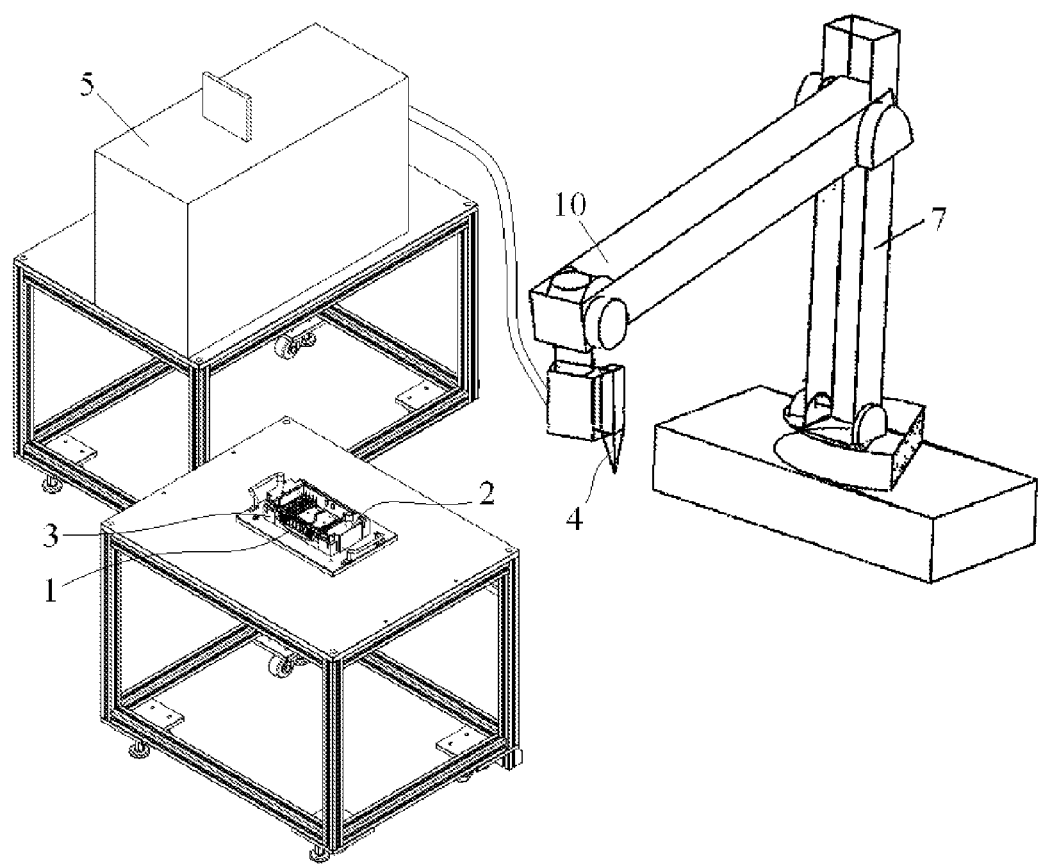
FIG. 3 is a perspective view of an automatic gel injection system according to the invention.

In order to increase the gel injection speed and improve the gel injection accuracy, the injection of the sealing gel is performed by a multi-freedom robot 7. As shown in FIG. 3, an automatic gel injection system is provided. The fluid sealing gel is supplied from a gel supply container 5 to a nozzle 4 and injected into the recess 8 through the nozzle 4.

Although it is not shown, in an exemplary embodiment, the gel supply container 5 includes a heater for heating the sealing gel to convert the sealing gel into the fluid state and a pump for supplying the fluid sealing gel to the nozzle 4. In this way, it can ensure the sealing gel in the fluid state adapted to be fed by the pump.

In an exemplary embodiment of the invention, the pump is configured to be a speed adjustable pump capable of adjusting the supply speed of the fluid sealing gel.

Although it is not shown, in an exemplary embodiment, an additional heater is provided on the nozzle 4 to heat the sealing gel in the nozzle 4 so as to prevent the sealing gel in the nozzle 4 from being solidified. In some conditions, the additional heater is necessary, especially in a low temperature condition, since the sealing gel in the nozzle 4 is likely solidified. Once the sealing gel is solidified in the nozzle 4, the nozzle 4 is blocked, and it will cause the entire automatic gel injection system failed. In this way, the additional heater can keep the sealing gel in the fluid state in the nozzle 4 to prevent the nozzle 4 from being blocked.

As shown in FIG. 3, the multi-freedom robot 7 includes several arms and can move to a predetermined position in three-dimensional space so as to perform an accurate gel injection operation. In an exemplary embodiment, the nozzle 4 is secured to an end effector 10 of the robot 7 and can move with the end effector 10.

In order to facilitate the positioning of robot 7 with the recess of the work piece 1 in the three-dimensional space, the work piece 1 is prefixed on the positioning platform 3 before injecting the sealing gel into the recess 8. The positioning platform 3 is positioned at a preset position with respect to the robot 7. As a result, the robot 7 does not need to identify the positions of the work piece 1 and the positioning platform 3, and a great deal of calculation, such as a space coordinate transformation is omitted, saving the time and improving the efficiency.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:
1. A method of injecting a sealing gel to form a predetermined structure for a work piece, comprising steps of:
   providing a molding tool with an insertion structure shaped with respect to complement the predetermined structure;

enclosing a local region of a recess of the work piece with the molding tool, the recess of the work piece being an opening through a side of the work piece;

injecting a fluid sealing gel into the local region of the recess of the work piece and within the molding tool; and dismantling the molding tool after the sealing gel has cooled to a solid state, the sealing gel forming the predetermined structure as a side wall of the work piece, the predetermined structure including a vertical slot extending through the predetermined structure from an exterior of the work piece into an interior of the work piece.

2. The method according to claim 1, wherein the work piece has a box shaped body including the side wall.

3. The method according to claim 2, wherein the vertical slot extends along a height of the side wall.

4. The method according to claim 3, wherein the insertion structure includes a vertical rib corresponding to the vertical slot.

5. The method according to claim 4, wherein the molding tool includes an outside plate fittable with an outside surface of the side wall at the local region.

6. The method according to claim 5, wherein the molding tool further includes an inside plate fittable with an inside surface of the side wall at the local region.

7. The method according to claim 6, wherein the molding tool further includes a top cover plate covering a top surface of the outside plate.

8. The method according to claim 7, wherein the top cover plate covers a top surface of the inside plate.

9. The method according to claim 8, wherein the molding tool further includes an injection port passing through the top cover plate and communicating with an inside chamber thereof.

10. The method according to claim 9, wherein the fluid sealing gel is injected into the inside chamber of the molding tool through the injection port.

11. The method according to claim 7, wherein the top cover plate includes a vent hole.

12. The method according to claim 7, wherein the insertion structure is formed on at least one of the outside plate, the inside plate, and the top cover plate.

13. The method according to claim 1, further comprising the step of:

injecting a second sealing gel about an exposed recess in an open injection manner.

14. The method according to claim 1, wherein the sealing gel has a fluid state.

15. The method according to claim 1, wherein the sealing gel is a thermoplastic.

16. The method according to claim 14, further comprising the step of:

injecting the fluid sealing gel through a nozzle and into the recess.

17. The method according to claim 16, further comprising a gel supply container disposed before the nozzle.

18. The method according to claim 17, wherein the gel supply container includes a heater to convert the sealing gel into the fluid state and a pump pushing the fluid sealing gel to the nozzle.

19. The method according to claim 18, wherein the pump is a speed adjustable pump.

20. The method according to claim 19, further comprising an additional heater provided on the nozzle.

21. The method according to claim 20, wherein injection of the sealing gel is performed by a multi-freedom robot having an end effector on which the nozzle is mounted.

22. The method according to claim 1, wherein the work piece is disposed on a positioning platform before injecting the sealing gel.

23. The method according to claim 1, wherein the insertion structure extends into the local region of the recess.

24. The method according to claim 6, wherein the outside plate defines a first side of the predetermined structure and the inside plate defines an opposite second side of the predetermined structure.

* * * * *